(12) United States Patent
Yamada et al.

(10) Patent No.: US 8,584,604 B2
(45) Date of Patent: Nov. 19, 2013

(54) METHOD AND APPARATUS FOR CONTROLLING COMBUSTION IN OXYGEN FIRED BOILER

(75) Inventors: Toshihiko Yamada, Tokyo (JP); Toshiro Fujimori, Koto-ku (JP); Shinichi Takano, Koto-ku (JP)

(73) Assignees: Electric Power Development Co., Ltd., Tokyo (JP); IHI Corporation, Tokyo (JP)

( * ) Notice: Subject to any disclaimer, the term of this patent is extended or adjusted under 35 U.S.C. 154(b) by 1318 days.

(21) Appl. No.: 12/094,785

(22) PCT Filed: Nov. 28, 2006

(86) PCT No.: PCT/JP2006/323652
§ 371 (c)(1),
(2), (4) Date: May 23, 2008

(87) PCT Pub. No.: WO2007/061106
PCT Pub. Date: May 31, 2007

(65) Prior Publication Data
US 2009/0272300 A1 Nov. 5, 2009

(30) Foreign Application Priority Data
Nov. 28, 2005 (JP) ................................. 2005-342356

(51) Int. Cl.
*F23N 5/02* (2006.01)
*F23N 5/18* (2006.01)
*F27B 1/26* (2006.01)
*F24H 9/20* (2006.01)

(52) U.S. Cl.
USPC ............. 110/190; 110/186; 110/188; 432/36; 122/14.2

(58) Field of Classification Search
USPC ............ 110/233, 186, 203, 190, 188; 432/36; 122/14.22, 479, 150.1
See application file for complete search history.

(56) References Cited

U.S. PATENT DOCUMENTS 3,040,719 A * 6/1962 Dickey ......................... 122/479.4
3,284,615 A * 11/1966 Yetter ............................. 700/28
(Continued)

FOREIGN PATENT DOCUMENTS

EP 1 435 485 7/2004
JP 50-19026 3/1975
(Continued)

OTHER PUBLICATIONS

U.S. Appl. No. 12/094,789, filed May 23, 2008, Ookawa, et al.
(Continued)

*Primary Examiner* — Khoa Huynh
*Assistant Examiner* — Timothy K Trieu
(74) *Attorney, Agent, or Firm* — Oblon, Spivak, McClelland, Maier & Neustadt, L.L.P.

(57) ABSTRACT

Provided are a method and an apparatus for controlling combustion in an oxygen fired boiler which are easily applicable to an existing air fired boiler for easy and stable control of the combustion.
Oxygen with a setting amount in accordance with a boiler load demand 35 is supplied to a boiler body 4. Heat absorption amount of the boiler is measured from inlet temperature of feedwater supplied to the boiler body 4 and outlet temperature of steam. Recirculation flow rate of combustion exhaust gas 14a is controlled such that heat absorption amount 41 of the boiler body 4 becomes equal to a targeted heat absorption amount 42 to thereby control oxygen concentration in all gas guided to the boiler body 4.

5 Claims, 2 Drawing Sheets

(56) References Cited

U.S. PATENT DOCUMENTS

| | | |
|---|---|---|
| 3,957,418 A | 5/1976 | Sata |
| 4,699,071 A * | 10/1987 | Vier et al. .............. 110/345 |
| 5,906,806 A | 5/1999 | Clark |
| 6,119,606 A | 9/2000 | Clark |
| 6,216,611 B1 * | 4/2001 | Baudhuin .............. 110/233 |
| 6,574,962 B1 | 6/2003 | Hsu |
| 6,935,251 B2 | 8/2005 | Marin et al. |
| 2001/0000863 A1 | 5/2001 | Marin et al. |
| 2004/0001788 A1 | 1/2004 | Marin et al. |
| 2004/0237909 A1 | 12/2004 | Krebs |

FOREIGN PATENT DOCUMENTS

| | | |
|---|---|---|
| JP | 62-276322 | 12/1987 |
| JP | 05-168853 | 7/1993 |
| JP | 05-231609 | 9/1993 |
| JP | 5-231609 | 9/1993 |
| JP | 7-318016 | 12/1995 |
| JP | 07-318016 | 12/1995 |
| JP | 8-338602 | 12/1996 |
| JP | 10-110904 | 4/1998 |
| JP | 11-94205 | 9/1999 |
| JP | 2001-235103 | 8/2001 |
| JP | 2001-336736 | 12/2001 |

OTHER PUBLICATIONS

U.S. Appl. No. 12/920,704, filed Sep. 2, 2010, Terushita, et al.
U.S. Appl. No. 12/920,549, filed Sep. 1, 2010, Yamada, et al.
U.S. Appl. No. 12/920,542, filed Sep. 1, 2010, Terushita, et al.
U.S. Appl. No. 12/920,843, filed Sep. 3, 2010, Terushita, et al.
U.S. Appl. No. 12/920,602, filed Sep. 2, 2010, Terushita, et al.
U.S. Appl. No. 12/920,738, filed Sep. 2, 2010, Terushita, et al.
U.S. Appl. No. 12/920,686, filed Sep. 2, 2010, Yamada, et al.

* cited by examiner

METHOD AND APPARATUS FOR CONTROLLING COMBUSTION IN OXYGEN FIRED BOILER

TECHNICAL FIELD

The present invention relates to a method and an apparatus for controlling combustion in an oxygen fired boiler, and especially relates to a method and an apparatus for controlling combustion in an oxygen fired boiler when oxygen combustion is conducted using an existing air fired boiler.

BACKGROUND ART

Recently, global warming has been played up as environment-related issue on a mass global scale. It has been revealed that increase in concentration of carbon dioxide ($CO_2$) in the atmosphere is one of main causes of the global warming, and thermal power plants are attracting attention as fixed sources of discharging the matter. Used as fuel for thermal power generation is petroleum, natural gas or coal. Especially coal, which has great mineable reserves, is expected to have increasing demand in the future.

Coal has much carbon content in comparison with natural gas and petroleum and includes components such as hydrogen, nitrogen, sulfur and ash as inorganic matter, so that air combustion of coal brings about combustion exhaust gas substantially composed of nitrogen (about 70%) and including others such as carbon dioxide ($CO_2$), nitrogen oxides ($NO_x$), sulfur oxides ($SO_x$), steam, dust comprising ash and unburned coal particles and oxygen (about 4%). Thus, the combustion exhaust gas is discharged through a stack to the atmosphere after exhaust gas treatments such as denitration, desulfurization and dust removal are conducted to make $NO_x$, $SO_x$ and fine particles less than environmental emission standard.

$NO_x$ in combustion exhaust gas may be thermal $NO_x$ produced through oxidation of nitrogen in air by means of oxygen and fuel $NO_x$ produced through oxidation of nitrogen in fuel. Conventionally employed for decrease in production of thermal and fuel $NO_x$ are combustion with lowered flame temperature and combustion with a $NO_x$-reductive excessive fuel region in a combustor, respectively.

In combustion of coal or sulfur-containing fuel, the combustion exhaust gas includes $SO_x$ which is removed by a dry- or wet-type desulfurizer.

Carbon dioxide produced in larger quantity in combustion exhaust gas is also desired to be removed with higher efficiency. Conventional approach for withdrawal of carbon dioxide in combustion exhaust gas is, for example, absorption into amine or other absorbing solution, adsorption to solid adsorbent or separation through membrane. However, any of them has lower efficiency and is not in practical use.

Then, combustion of fuel by means of oxygen in lieu of air has been proposed as effective technique for separation of carbon dioxide and suppression in production of thermal $NO_x$ in combustion exhaust gas (see, for example, Reference 1).

Oxygen combustion of coal produces no thermal $NO_x$ and brings about combustion exhaust gas substantially composed of carbon dioxide and including others such as fuel $NO_x$ and $SO_x$, which fact makes it relatively easy to cool the combustion exhaust gas for liquefaction and separation of carbon dioxide.

However, oxygen combustion involves a technical problem of higher flame temperature to be dealt with, for example, by improving heat resistance and lifespan of materials of a combustion furnace. As shown in Reference 1, known as a countermeasure for the problem is exhaust gas recirculation by branching combustion exhaust gas from a combustion furnace after exhaust gas treatment and mixing the branched combustion exhaust gas with combustion gas such as oxygen or air to be fed to the combustion furnace.

For the exhaust gas recirculation, disclosed in Reference 1 are means for cooling combustion exhaust gas treated by combustion exhaust gas treatment means to −80° C. or less for liquefaction and storage of carbon dioxide so as to separate the same from oxygen, a compressive blower for compressing the oxygen for liquefaction and storage thereof and means for vaporizing the stored oxygen for recirculation to a combustion gas supply line.

[Reference 1] Japanese Patent No. 3068888

SUMMARY OF THE INVENTION

Problems to be Solved by the Invention

However, the technique disclosed in Reference 1 is disadvantageous in devices and in energy in that the combustion exhaust gas is cooled by a cooler for liquefaction and storage of the carbon dioxide and the oxygen is compressed for liquefaction and storage thereof, part of the stored, liquefied oxygen being recirculated to a combustion air supply line.

More specifically, concentration of oxygen in the combustion exhaust gas from the combustion equipment is generally as low as 4% or so. In order to recover such low content of oxygen, a device and drive energy are disadvantageously required such that the oxygen after liquefaction and separation of carbon dioxide through cooling by the cooler is compressed by a compressive blower for recovery in liquefied form.

Moreover, as mentioned in the above, oxygen combustion involves a technical problem of higher flame temperature which is problematic with respect to heat resistance and lifespan of components of a combustion furnace. In order to overcome the problem, Reference 1 is premised on recirculation of combustion exhaust gas. However, how control is made for enabling stable operation is not disclosed at all. Thus, it is impossible to actually operate an oxygen fired boiler by the technique disclosed in Reference 1 above.

More specifically, for example, Reference 1 discloses that used as combustion gas is mixed gas of carbon dioxide obtained through separation from combustion exhaust gas with oxygen separated from air with oxygen concentration in the mixed gas being made equal to that in the air. However, the combustion equipment may have varied load and thus it is natural that oxygen may lack when the load is increased and a supplied amount of fuel is increased. In this manner, Reference 1 has no consideration on technique for stable operation of an oxygen fired boiler.

The invention was made in view of the above and has its object to provide a method and an apparatus for controlling combustion in an oxygen fired boiler which are easily applicable to an existing air fired boiler for easy and stable control of the combustion, by setting an amount of oxygen to be supplied to a boiler body on the basis of boiler load demand and controlling a recirculation flow rate of combustion exhaust gas on the basis of a heat absorption amount of the boiler body to control an oxygen concentration in all the gas guided into the boiler body.

Means or Measures for Solving the Problems

The invention is directed to a method for controlling combustion in an oxygen fired boiler wherein air is separated into oxygen and other nitrogen-prevailing gas by an air separation unit, the oxygen obtained by the air separation unit and fuel being burned in a boiler body to heat feedwater to produce steam, combustion exhaust gas from the boiler body being, at least after dust removal treatment, partly recirculated as recirculation gas to the boiler body, characterized in that it comprises supplying oxygen to the boiler body in a setting amount in accordance with a boiler load demand, measuring a heat absorption amount of the boiler using an inlet temperature of the feedwater supplied to the boiler body and an outlet temperature of steam and/or a combustion exhaust gas temperature in the boiler, and controlling a recirculation flow rate of said recirculation gas to make the heat absorption amount of the boiler body equal to a targeted heat absorption amount to thereby control a concentration of oxygen in all gas guided to the boiler body.

In the method for controlling the combustion in the oxygen fired boiler, it is preferable that arranged are a line for supply of said oxygen mixed with the recirculation gas to the boiler body and a line for supply of said oxygen directly to the boiler body, the heat absorption amount of the boiler body being controlled by changing flow rate ratios of the oxygen supplied to said lines.

In the method for controlling the combustion in the oxygen fired boiler, it is preferable that the recirculation flow rate of said recirculation gas is controlled such that the heat absorption amount of said boiler body becomes equal to the heat absorption amount of an existing air fired boiler.

The invention is directed to an apparatus for controlling an oxygen fired boiler having fuel supply means, an air separation unit for separating air into oxygen and nitrogen-prevailing gas, a boiler body for receiving fuel from said fuel supply means and oxygen from said air separation unit for combustion, thereby heating feedwater to produce steam, a flue for guiding the combustion exhaust gas in said boiler body to outside, exhaust gas treatment means arranged in said flue for conducting at least dust removal, an exhaust gas recirculation flow passage for recirculating to said boiler body part of the combustion exhaust gas treated by said exhaust gas treatment means, characterized in that it comprises an oxygen supplied amount controller for controlling an amount of oxygen supplied to said boiler body in accordance with a boiler load demand, recirculation flow rate control means in said exhaust gas recirculation flow passage, an inlet temperature gauge for measuring temperature of feedwater supplied to said boiler body, an outlet temperature gauge for measuring steam temperature at an outlet of the boiler body, a heat absorption amount measuring unit for measuring heat absorption amount of the boiler body on the basis of the inlet and outlet temperatures measured by said inlet and outlet temperature gauges and a recirculation flow rate controller for controlling recirculation flow rate of the recirculation gas using said recirculation flow rate control means so as to make a heat absorption amount measured by said heat absorption amount measuring unit equal to a targeted heat absorption amount.

In the apparatus for controlling the combustion in the oxygen fired boiler, it is preferable that in lieu of or in addition to said inlet and outlet temperature gauges an exhaust gas temperature gauge is arranged to measure a combustion exhaust gas temperature of the boiler, detected exhaust gas temperature of said exhaust gas temperature gauge being transmitted to said heat absorption amount measuring unit to measure the heat absorption amount of the boiler body.

In the apparatus for controlling the combustion in the oxygen fired boiler, it is preferable that for possible changeover an air supply line for supplying air for start-up of the boiler is connected to said exhaust gas recirculation flow passage.

Effects of the Invention

A method and an apparatus for controlling combustion in an oxygen fired boiler according to the invention, which set an amount of oxygen supplied to a boiler body in response to boiler load demand and detect the heat absorption of the boiler body to control the recirculation flow rate of all the gas guided to the boiler body such that the heat absorption of the boiler body becomes equal to the targeted heat absorption so as to control oxygen concentration of all the gas guided to the boiler body, so that the amount of oxygen supplied to the boiler body even including oxygen included in the recirculation gas. Thus, excellent effects and advantages can be obtained such that combustion control of boiler body is much simplified and stabilized, and thus easily applicable to an existing air fired boiler for stabilization of the combustion.

Figure 1:
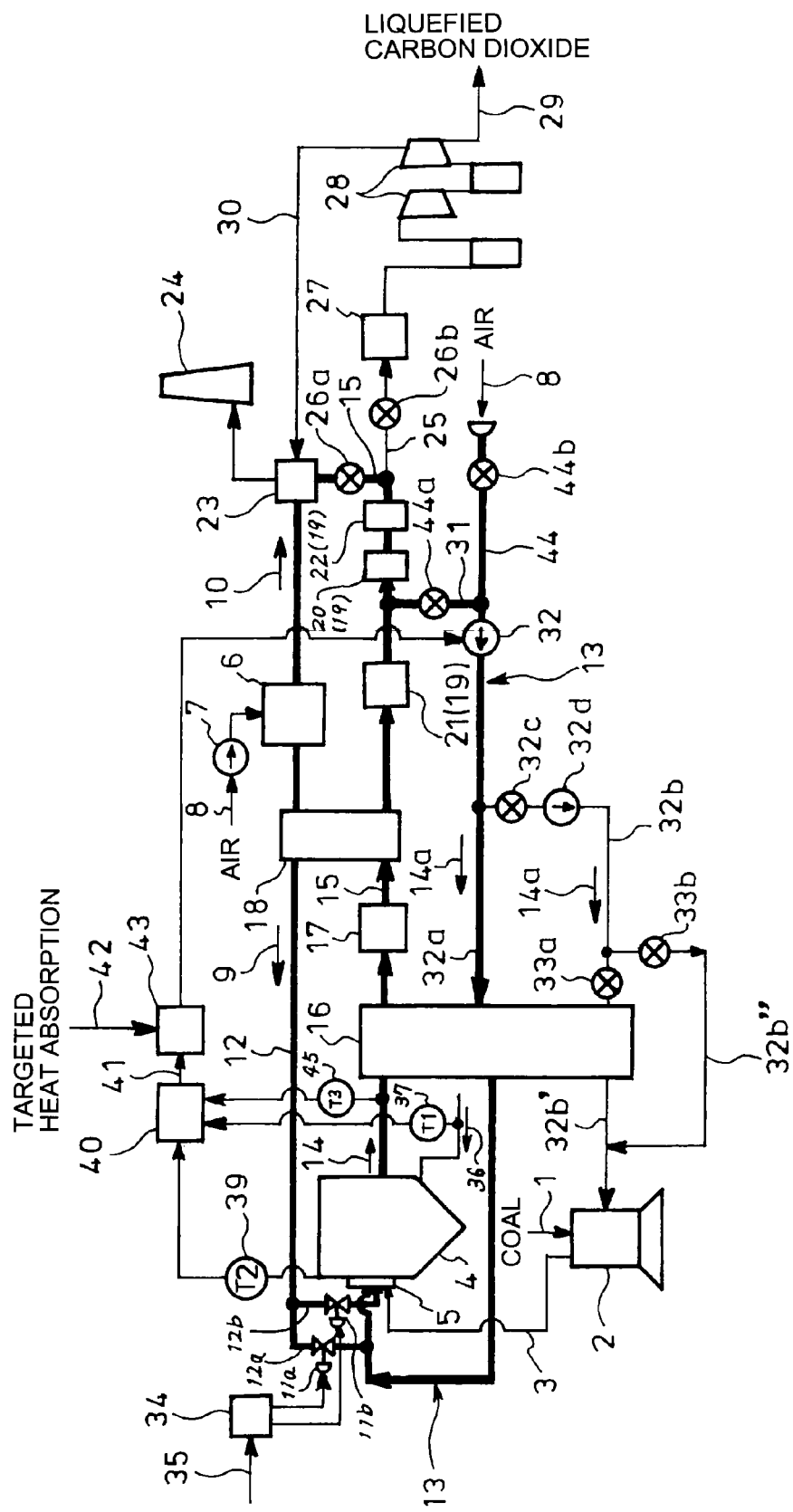
FIG. 1 is a block diagram showing an embodiment of the invention.

EXPLANATION OF THE REFERENCE NUMERALS 2 coal mill (fuel supply means)
3 pulverized coal fuel (fuel)
4 boiler body
6 air separation unit
8 air
9 oxygen
10 nitrogen-prevailing gas
11$a$, 11$b$ oxygen flow rate control means
12$a$ and 12$b$ lines
13 exhaust gas recirculation flow passage
14 combustion exhaust gas
14$a$ recirculation gas
15 flue
19 exhaust gas treatment means
32 recirculating fan (recirculation flow rate control means)
34 oxygen supplied amount controller
35 boiler load demand
36 feedwater
37 inlet temperature gauge
38 steam
39 outlet temperature gauge
40 heat absorption amount measuring unit
41 measured heat absorption amount
42 targeted heat absorption amount
43 recirculation flow rate controller
44 air supply line
45 exhaust gas temperature gauge

BEST MODE FOR CARRYING OUT THE INVENTION

Next, an embodiment of the invention will be described in conjunction with the attached drawings.

FIG. 1 is a block diagram showing an embodiment of an oxygen fired boiler according to the invention applied to a coal fired boiler. Coal 1 as fuel is pulverized in a coal mill 2 as fuel supply means into pulverized coal fuel 3 which is supplied to a burner 5$a$ in a wind box 5 on a boiler body or furnace 4 shown in FIG. 2. Air 8 is supplied via a blower 7 to an air separation unit 6 where air 8 is separated into oxygen 9 and the other nitrogen-prevailing gas 10. The oxygen 9 separated by the air separation unit 6 and passed through an oxygen supply flow passage 12 is partly supplied via a line 12a to an exhaust gas recirculation flow passage 13 detailed hereinafter and then supplied as gas mixed with recirculation gas 14a to the wind box 5, the remainder being directly supplied via a line 12b to the burner 5a.

In the boiler body 4, the pulverized coal fuel 3 is burned with the oxygen 9 as oxidant; since the coal is composed of carbon, hydrogen, nitrogen, sulfur and the like, these components are oxidized by the oxygen 9 to produce acid gases such as carbon dioxide ($CO_2$), nitrogen oxides ($NO_x$) and sulfur oxides ($SO_x$).

The combustion exhaust gas 14 including the acid gases such as $CO_2$, $NO_x$ and $SO_x$ and powder dust, which is passed through a flue 15 and via a gas preheater 16, a feedwater heater 17 and an oxygen preheater 18 for preheating of the oxygen 9, is freed from dust in a dust collector 21 as exhaust gas treatment means 19, is freed from $NO_x$ in a denitrator 20 as exhaust gas treatment means 19 and is freed from $SO_x$ in a desulfurizor 22 as exhaust gas treatment means 19. The combustion exhaust gas 14 includes carbon dioxide ($CO_2$) with enhanced concentration; the combustion exhaust gas 14 mainly composed of carbon dioxide and passed through the desulfurizor 22 is guided to a mixer 23 for mixing and dilution with the nitrogen-prevailing gas 10 separated by the air separation unit 6 and is guided to a stack 24 for discharge.

Connected to the flue 15 between the desulfurizor 22 and the mixer 23 is a carbon dioxide recovery flow passage 25 for taking-out of the combustion exhaust gas 14; the combustion exhaust gas 14 taken out by flow rate controllers 26a and 26b (adjusting dampers) to the flow passage 25 is freed further from dust by a filter 27 and then is compressed by a compressor 28 for recovery as liquefied carbon dioxide 29, the unliquefied exhaust gas components 30 such as $NO_x$ and $SO_x$ being guided to the mixer 23 for mixing and dilution with the nitrogen-prevailing gas 10 and to the stack 24.

Connected to the flue 15 at an outlet of the dust collector 21 is the exhaust gas recirculation flow passage 13a via a branch flow passage 31 for taking out part of the combustion exhaust gas 14. By a recirculating fan 32 (recirculation flow rate control means) in the recirculation flow passage 13, the recirculation gas 14a is supplied via the gas preheater 16 into the wind box 5 on the boiler body 4. Supplied to the exhaust gas recirculation flow passage 13 at an inlet of the wind box 5 is the oxygen 9 by the line 12a.

The exhaust gas recirculation flow passage 13 shown in FIG. 1 comprises a recirculation passage 32a for guidance via the gas preheater 16 into the wind box 5 as mentioned above and a fuel transfer passage 32b which is branched from the recirculation passage 32a to partly take out the recirculation gas 14a via an adjusting damper 32c and a primary air fan 32d, the fuel transfer passage 32b comprising a preheating passage 32b' which further partly guides the recirculation gas 14a via the gas preheater 16 and a bypass passage 32b" which guides the remainder of the recirculation gas 14a to bypass the gas preheater 16, the recirculation gas 14a passed through the passages 32b' and 32b" being jointly guided to the coal mill 2. Temperature of the recirculation gas 14a guided to the coal mill 2 is controlled by controlling flow rate controllers 33a and 33b (adjusting dampers) arranged in the passages 32b' and 32b".

Connected at an inlet of the recirculating fan 32 to the exhaust gas recirculation flow passage 13 is an air supply line 44 which supplies air 8 for start-up of the boiler. By flow rate controllers 44a and 44b in the branch flow passage 31 and the air supply line 44, respectively, the air 8 in lieu of the combustion exhaust gas 14 may be supplied to the recirculating fan 32.

As mentioned in the above, the oxygen combustion involves the technical problem of higher flame temperature which is problematic with respect to heat resistance and lifespan of components of the boiler body 4, so that the oxygen fired boiler is difficult to stably operate. Especially, variation in supplied amount of oxygen may, even if it is slight, substantially vary the combustion status; thus, in FIG. 1, a combustion controller is provided for stable oxygen combustion of the oxygen fired boiler.

Arranged in the oxygen fired boiler shown in FIG. 1 is an oxygen supplied amount controller 34 which controls an amount of the oxygen 9 supplied to the boiler body 4 by controlling opening degrees of the oxygen flow rate control means 11a and 11b in the lines 12a and 12b, respectively.

The amount of the oxygen supplied to the boiler body 4 by the oxygen flow rate control means 11a and 11b is set such that oxygen concentration in total gas which is summation of the recirculation gas 14a supplied to the boiler body 4 and the oxygen 9, i.e., the concentration of oxygen including even the oxygen (about 4%) in the recirculation gas 14a is equal to a preliminarily obtained oxygen concentration in total gas supplied to a boiler body 4 in an existing, exhaust gas recirculation type air fired boiler. Thus, the oxygen supplied amount controller 34 controls the oxygen flow rate control means 11a and 11b in accordance with the boiler load demand 35 (fuel supply demand) such that the amount of all the oxygen supplied to the boiler body 4 becomes equal to the preliminarily obtained amount of all the oxygen supplied in an existing air fired boiler. The oxygen supplied amount controller may change opening degrees of the oxygen flow rate control means 11a and 11b to change flow rate ratios of the oxygen 9 supplied by the lines 12a and 12b, thereby changing ignition position of burner flame to improve the heat absorption amount of the boiler body 4.

Figure 2:
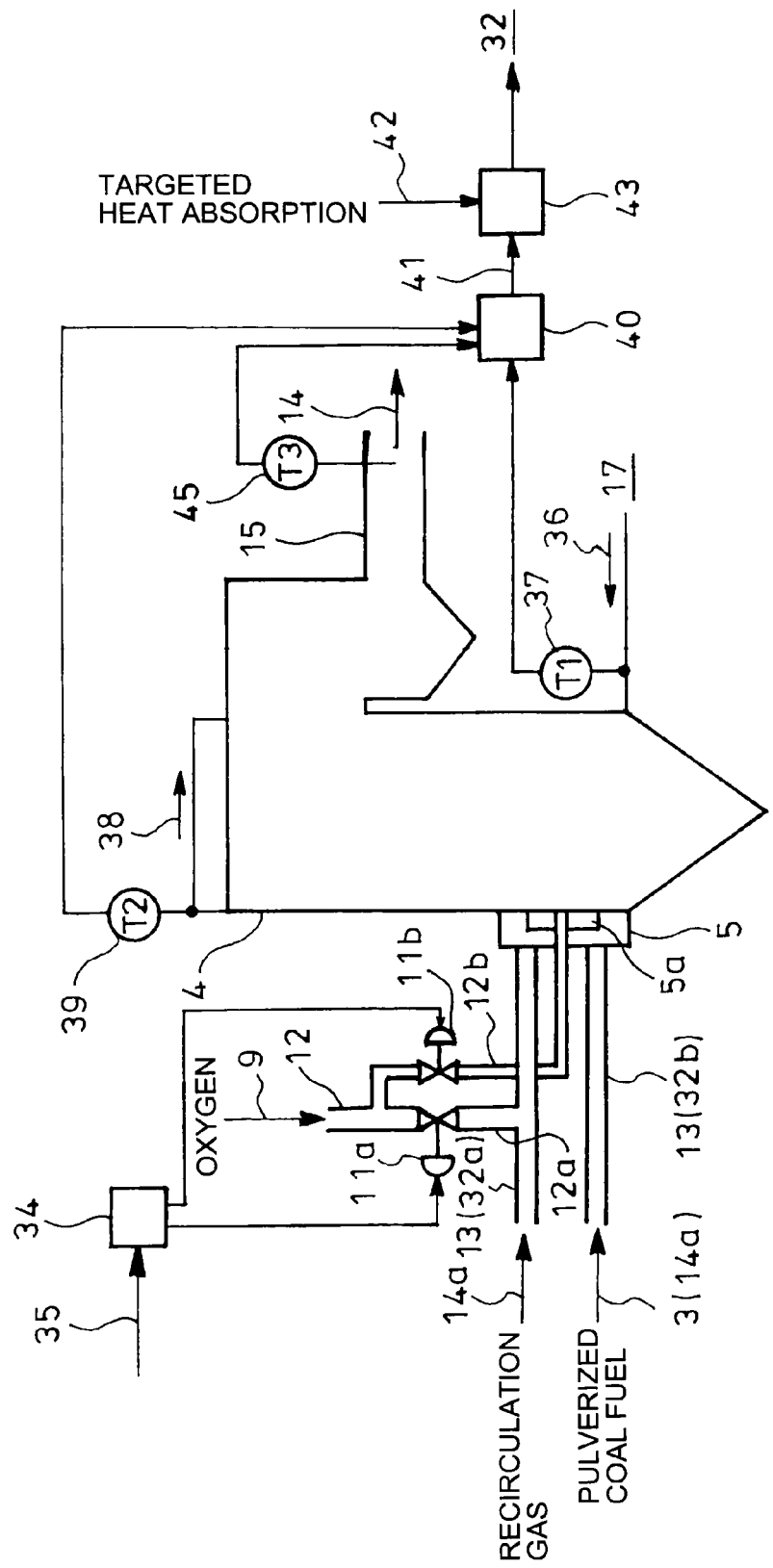
FIG. 2 is a view for explanation in construction of the boiler body in FIG. 1.

As best shown in FIG. 2, the boiler body 4 is provided with an inlet temperature gauge 37 (T1) which measures temperature of feedwater 36 supplied from the feed water heater 17 to the boiler body 4 and an outlet temperature gauge 39 (T2) which measures temperature of steam 38 at an outlet of the boiler body 4, a heat absorption amount measuring unit 40 which measures the heat absorption amount of the boiler body 4 on the basis of the inlet and outlet temperatures measured by the gauges 37 and 39 and a recirculation flow rate controller 43 which control the recirculating fan 32 (recirculation flow rate control means) such that the heat absorption amount 41 measured by the heat absorption measuring unit 40 becomes equal to a targeted heat absorption amount 42 (preliminarily obtained heat absorption amount in an existing air fired boiler for enabling stable operation).

Moreover, an exhaust gas temperature gauge 45 is provided to measure temperature of the combustion exhaust gas 14 at the outlet of the boiler body 4, the detected exhaust gas temperature from the temperature gauge 45 being transmitted to the heat absorption amount measuring unit 40 for measurement of the heat absorption amount of the boiler body 4. The exhaust gas temperature gauge 45 may be singularly arranged for measurement of the heat absorption amount in the boiler body 4; alternatively, it may be arranged together with the inlet and outlet temperature gauges 37 and 39 for measurement of the heat absorption amount of the boiler body 4.

Exemplified in the above embodiment is a case where supply of the oxygen 9 is parted into two lines 12a and 12b, the oxygen being partly supplied through the line 12a to the wind box 5 after mixing with the recirculation gas 14a in the exhaust gas recirculation flow passage 13, the remainder being directly supplied through the line 12b to the burner 5a. Alternatively, all of the oxygen may be mixed with the recirculation gas 14a in the exhaust gas recirculation flow passage 13 and supplied to the wind box 5.

Next, mode of operation of the above embodiment will be described.

During start-up of the oxygen fired boiler shown in FIG. 1, the flow rate controllers 44b and 44a are opened and completely closed, respectively, and the air 8 is supplied to the burner 5a of the boiler body 4 by driving the recirculating fan 32, the pulverized coal fuel 3 from the coal mill 2 being burned with air. The combustion of the pulverized coal fuel 3 with the air 8 brings about the combustion exhaust gas 14 composed of about 70% of nitrogen, the remainder being composed of carbon dioxide ($CO_2$), $SO_x$ and steam and the like. The combustion exhaust gas 14 is treated by a dust collector 21, a denitrator 20 and a desulfurizator 22 of the exhaust gas treatment means 19, so that the gas is discharged via the stack 24 to the atmosphere with the respective components being kept below environmental emission standard.

When the heat absorption amount of the boiler body 4 reaches a predetermined value, the oxygen 9 obtained by the air separation unit 6 is supplied to the burner 5a of the boiler body 4 for oxygen combustion with the flow rate controller 44a and 44b being opened and completely closed, respectively, the combustion exhaust gas 14 being partly supplied as recirculation gas 14a via exhaust gas recirculation flow passage 13 to the burner 5a of the boiler body 4. Then, with the recirculation gas 14a being supplied, the supply of the nitrogen contained in the air 8 is stopped and the nitrogen concentration in the combustion exhaust gas 14 is gradually reduced. After substantially no nitrogen remains in the combustion exhaust gas 14, the flow rate controllers 26a and 26b are controlled to supply part or all of the combustion exhaust gas 14 directed toward the stack 24 to the compressor 28 for recovery of the liquefied carbon dioxide 29. The combustion exhaust gas 14 directed toward the stack 24 and the exhaust gas components 30 such as $NO_x$ and $SO_x$ unliquefied by the compressor 28 are guided to the mixer 23 where they are mixed and diluted with a great amount of nitrogen-prevailing gas 10 from the air separation unit 6 and can be discharged through the stack 24. Thus, the steady operation is started.

During the steady operation, in accordance with the boiler load demand 35 for combustion control of the boiler body 4, the oxygen supplied amount controller 34 controls the oxygen flow rate control means 11a and 11b to control, to the setting flow rate, the flow rate of the oxygen 9 supplied from the oxygen supply flow passage 12 via the lines 12a and 1b to the boiler body 4. In this case, the amount of oxygen supplied to the boiler body 4 is controlled such that concentration of oxygen in all gas which is summation of the recirculation gas 14a and the oxygen 9 supplied to the boiler body 4, i.e., concentration of oxygen including even the oxygen (about 4%) in the recirculation gas 14a becomes equal to the preliminarily obtained concentration of oxygen in all gas supplied to an existing, stably operated air fired boiler.

On the other hand, the feedwater temperature detected at the inlet of the boiler body 4 by the inlet temperature gauge 37 and the steam temperature detected at the outlet of the boiler body 4 by the outlet temperature gauge 39 are transferred to the heat absorption amount measuring unit 40, the combustion exhaust gas temperature from the exhaust gas temperature gauge 45 is transmitted singularly or together with the boiler inlet and outlet temperatures to the heat absorption amount measuring unit 40. The heat absorption amount measuring unit 40 measures the heat absorption amount 41 of the boiler body 4, the measured heat absorption amount 41 being inputted into the recirculation flow rate controller 43. The recirculation flow rate controller 43 controls the recirculating fan 32 (recirculation flow rate control means) such that the heat absorption amount 41 becomes equal to the targeted heat absorption amount 42, thereby controlling the recirculation flow rate of the recirculation gas 14a.

In this case, the recirculation flow rate controller 43 controls the recirculating fan 32 such that the heat absorption amount 41 becomes equal to the targeted heat absorption amount 42 preliminarily obtained in an existing air fired boiler for enabling stable operation to thereby control the recirculation flow rate of the recirculation gas 14a.

As mentioned in the above, the amount of oxygen supplied to the boiler body 4 is controlled to a setting value based on the boiler load demand 35 for combustion control of the boiler body 4 and the recirculation flow rate of the recirculation gas 14a is controlled such that the heat absorption amount of the boiler body 4 becomes equal to that in an existing air fired boiler, so that an oxygen fired boiler can be worked, using the construction and technique of an existing air fired boiler with reliability. Thus, especially an existing air fired boiler can be effectively utilized and changed into an oxygen fired boiler.

The oxygen supplied amount controller 34 may change the opening degrees of the oxygen flow rate control means 11a and 11b to change flow rate ratios of the oxygen 9 supplied via the lines 12a and 12b, so that ignition position of burner flame may be changed to improve the heat absorption amount of the boiler body 4. For example, the heat absorption amount may be increased by increasing the flow rate in the line 12b for direct supply of the oxygen 9 to the burner 5a; thus, it is preferable in carrying out the invention that the control by the recirculation flow rate controller 43 is combined with the control of changing the flow rate ratios of the oxygen 9 supplied via the lines 12a and 12b.

Exemplified in the above embodiment is an application to a coal fired boiler where coal includes volatile portions such as carbon, hydrogen, nitrogen and sulfur and produces acid gases such as $CO_2$, $NO_x$ and $SO_x$. The invention may be also applicable for example to a thermal power boiler with fuel being natural gas and petroleum having less contents of nitrogen, sulfur and the like; in this case, the exhaust gas treatment means may be omitted or changed into smaller sizes and the coal mill 2 and the fuel transfer line 32b therefor may be omitted.

It is to be understood that a method and an apparatus for controlling combustion in an oxygen fired boiler according to the invention is not limited to the above embodiment and that various changes and modifications may be made without deviating from the gist of the invention.

The invention claimed is:

1. A method for controlling combustion in an oxygen fired boiler, comprising the steps of:
   separating air into oxygen and other nitrogen-prevailing gas by an air separation unit,
   burning the oxygen obtained by the air separation unit and fuel in a boiler body to heat feedwater to produce steam,
   partly recirculating combustion exhaust gas from the boiler body, at least after dust removal treatment, as recirculation gas to the boiler body,
   supplying oxygen to the boiler body in a setting amount in accordance with a boiler load demand,
   measuring a heat absorption amount of the boiler using an inlet temperature of the feedwater supplied to the boiler body and an outlet temperature of the steam and/or a combustion exhaust gas temperature in the boiler, and controlling a recirculation flow rate of said recirculation gas to said boiler body to make the heat absorption amount equal to a targeted heat absorption amount to thereby control a concentration of oxygen in all gas guided to the boiler body, wherein the boiler is provided with a line for supply of said oxygen mixed with the recirculation gas to the boiler body and a line for supply of said oxygen directly to the boiler body, further comprising the steps of controlling an amount of all the oxygen supplied to the boiler body in accordance with a boiler load demand via said line for supply of said oxygen mixed with the recirculation gas to the boiler body and said line for supply of said oxygen directly to the boiler body, such that the amount of all the oxygen supplied to the boiler body becomes equal to a preliminarily obtained amount of all the oxygen supplied in an existing air fired boiler, controlling the recirculation flow rate of said recirculation gas such that the heat absorption amount becomes equal to a heat absorption amount of the existing air fired boiler, and changing flow rate ratios of the oxygen supplied to the boiler body via said line for supply of said oxygen mixed with the recirculation gas to the boiler body and said line for supply of said oxygen directly to the boiler body, thereby changing an ignition position of a burner flame to improve the heat absorption amount of the boiler body.

2. In an apparatus for controlling an oxygen fired boiler having fuel supply means, an air separation unit for separating air into oxygen and nitrogen-prevailing gas, a boiler body for receiving fuel from said fuel supply means and oxygen from said air separation unit for combustion, thereby heating feedwater to produce steam, a flue for guiding the combustion exhaust gas in said boiler body to outside, exhaust gas treatment means arranged in said flue for conducting at least dust removal, an exhaust gas recirculation flow passage for recirculating to said boiler body part of the combustion exhaust gas treated by said exhaust gas treatment means, said apparatus comprising an oxygen supplied amount controller for controlling an amount of oxygen supplied to said boiler body in accordance with a boiler load demand, recirculation flow rate control means in said exhaust gas recirculation flow passage, an inlet temperature gauge for measuring temperature of feedwater supplied to said boiler body, an outlet temperature gauge for measuring steam temperature at an outlet of the boiler body, a line for supply of said oxygen mixed with the recirculation gas to the boiler body and a line for supply of said oxygen directly to the boiler body, a heat absorption amount measuring unit for measuring heat absorption amount of the boiler body on the basis of the inlet and outlet temperatures measured by said inlet and outlet temperature gauges and a recirculation flow rate controller for controlling recirculation flow rate of the recirculation gas using said recirculation flow rate control means so as to make the heat absorption amount measured by said heat absorption amount measuring unit equal to a targeted heat absorption amount, wherein said oxygen supplied amount controller is configured to control an amount of all the oxygen supplied to the boiler body in accordance with a boiler load demand via said line for supply of said oxygen mixed with the recirculation gas to the boiler body and said line for supply of said oxygen directly to the boiler body, such that the amount of all the oxygen supplied to the boiler body becomes equal to a preliminarily obtained amount of all the oxygen supplied in an existing air fired boiler, to control the recirculation flow rate of said recirculation gas such that the heat absorption amount becomes equal to a heat absorption amount of the existing air fired boiler, and to change flow rate ratios of the oxygen supplied to the boiler body via said line for supply of said oxygen mixed with the recirculation gas to the boiler body and said line for supply of said oxygen directly to the boiler body, thereby changing an ignition position of a burner flame to improve the heat absorption amount of the boiler body.

3. The apparatus for controlling an oxygen fired boiler according to claim 2, wherein in lieu of or in addition to said inlet and outlet temperature gauges an exhaust gas temperature gauge is arranged to measure a combustion exhaust gas temperature of the boiler, detected exhaust gas temperature of said exhaust gas temperature gauge being transmitted to said heat absorption amount measuring unit to measure the heat absorption amount of the boiler body.

4. The apparatus for controlling an oxygen fired boiler according to claim 2, wherein for possible changeover an air supply line for supplying air for start-up of the boiler is connected to said exhaust gas recirculation flow passage.

5. The apparatus for controlling an oxygen fired boiler according to claim 3, wherein for possible changeover an air supply line for supplying air for start-up of the boiler is connected to said exhaust gas recirculation flow passage.

\* \* \* \* \*